(12) United States Patent
Tao

(10) Patent No.: US 9,265,132 B2
(45) Date of Patent: Feb. 16, 2016

(54) LINEAR DRIVER FOR REDUCED PERCEIVED LIGHT FLICKER

(75) Inventor: Haimin Tao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 291 days.

(21) Appl. No.: 13/989,546

(22) PCT Filed: Dec. 1, 2011

(86) PCT No.: PCT/IB2011/055399
§ 371 (c)(1),
(2), (4) Date: May 24, 2013

(87) PCT Pub. No.: WO2012/080890
PCT Pub. Date: Jun. 21, 2012

(65) Prior Publication Data
US 2013/0249426 A1    Sep. 26, 2013

Related U.S. Application Data

(60) Provisional application No. 61/423,144, filed on Dec. 15, 2010.

(51) Int. Cl.
*H05B 37/00* (2006.01)
*H05B 37/02* (2006.01)
*H05B 33/08* (2006.01)

(52) U.S. Cl.
CPC ........ *H05B 37/0281* (2013.01); *H05B 33/0809* (2013.01); *H05B 33/0842* (2013.01)

(58) Field of Classification Search
None
See application file for complete search history.

(56) References Cited

U.S. PATENT DOCUMENTS

| 6,212,082 | B1 | 4/2001 | Bailly | |
|---|---|---|---|---|
| 2007/0153520 | A1 | 7/2007 | Curran et al. | |
| 2011/0156612 | A1* | 6/2011 | Kanamori et al. | 315/291 |
| 2011/0248640 | A1* | 10/2011 | Welten | 315/210 |

FOREIGN PATENT DOCUMENTS

| DE | 102010040266 A1 | 9/2011 |
|---|---|---|
| EP | 2385748 A1 | 11/2011 |
| JP | 11307815 A | 5/1999 |
| WO | 2009001279 A1 | 12/2008 |
| WO | 2010024977 A1 | 3/2010 |
| WO | 2010027254 A1 | 3/2010 |
| WO | 2010038190 A1 | 4/2010 |

* cited by examiner

*Primary Examiner* — Long Nguyen
(74) *Attorney, Agent, or Firm* — Yuliya Mathis

(57) ABSTRACT

A driver (100) supplies power to drive at least one light source (130). The driver includes: a current regulator (140) connected in series with the at least one light source; and a conditioning circuit (120) configured to receive an AC supply voltage (110) having a primary frequency of between about 50 Hz to 60 Hz, and further configured to condition the received AC supply voltage to supply power to the at least one light source, wherein the conditioned voltage has a non-zero DC component and an AC component, and wherein a magnitude of the AC component at a frequency that is four times the primary frequency is greater than a magnitude of the AC component at the primary frequency, and is also greater than a magnitude of the AC component at a second harmonic of the primary frequency.

16 Claims, 6 Drawing Sheets

LINEAR DRIVER FOR REDUCED PERCEIVED LIGHT FLICKER

TECHNICAL FIELD

The present invention is directed generally to driver circuitry for lighting devices. More particularly, various inventive methods and apparatus disclosed herein relate to a linear driver for reducing flicker in a lighting device.

BACKGROUND

Illumination devices based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting units that enable a variety of lighting effects in many applications. Some lighting units feature one or more light sources, including one or more LEDs capable of producing different colors, e.g. red, green, and blue, as well as a processor for independently controlling the output of the LEDs in order to generate a variety of colors and color-changing lighting effects.

Because of their small size and low-cost, simple linear driver circuits have generated considerable interest in field of the LED drivers. One of the biggest concerns regarding LED lighting is light flicker that can be perceived by the human eye. Because LEDs have a very fast dynamic response, energy storage is often employed to bridge the fluctuation in the instantaneous input power (50 Hz or 60 Hz "mains" voltage), in order to reduce flicker. This is typically achieved by adding large electrolytic capacitors at the primary and/or secondary side of the driver. In view of the fact that the dynamic resistance of an LED reduces as the LED efficiency improves, flicker reduction becomes more challenging for a space-constrained driver. Most existing LED drivers have a predominant frequency component in the LED light/current at twice the mains frequency (i.e., at 100 Hz or 120 Hz), where the human eye is sensitive to the modulated light.

On the other hand, at frequencies above 200 Hz, the human eye is much less sensitive to the modulated light (10 Hz being the most sensitive). Therefore, if a driver can be made with a predominant AC component in the light output at 200 Hz or above, the perceived light flicker will be substantially reduced or eliminated, though light modulation still occurs.

Thus, there is a need in the art to provide a driver for a light source, and particularly an LED light source, which can reduce or eliminate visible flicker.

SUMMARY

The present disclosure is directed to a driver for driving one or more light sources, for example LED light sources. More specifically, the present disclosure focuses on a driver for a light source wherein visible flicker produced by the one or more light sources is reduced by increasing the frequency of the predominant AC component in the power supplied to the one or more light sources.

Generally, in one aspect, a driver for supplying power to drive at least one light source includes: a rectifier having an input and an output, wherein the rectifier is configured to receive an AC supply voltage at its input, and wherein the rectifier output is connected to the at least one light source; and a capacitor connected across the rectifier output; wherein the at least one light source is driven by the rectifier output during a first portion of a period of the AC supply voltage, wherein the at least one light source is driven by the capacitor during a second portion of the period of the AC supply voltage, wherein the first and second portions of the period of the AC supply voltage have approximately the same duration. In one embodiment, the at least one light source is not driven during a third portion of the period of the AC supply voltage.

Also, in one embodiment, the capacitor is connected across the rectifier output in series with a parallel combination of: (1) a first branch that provides a charging current path for the capacitor and that blocks a discharging current of the capacitor from flowing through the first branch; and (2) a switching device that provides a controlled discharging current path for the capacitor, wherein the switching device has a first impedance when the switching device is open, and has a second impedance less than the first impedance when the switching device is closed. According to one optional feature of this embodiment, two diodes are connected antipodally to each other across the rectifier input and provide a rectified voltage at a node in between the two diodes. According to another optional feature of this embodiment, a controller is configured to control the switching device, wherein the controller controls the switching device to be open when the rectified voltage is greater than a threshold voltage, and controls the switching device to be closed when the rectified voltage is less than the threshold voltage. According to yet another optional feature of this embodiment, the switching device is open when the rectified voltage is greater than a threshold voltage, and wherein the switching device is closed when the rectified voltage is less than the threshold voltage.

Generally, in another aspect, a driver for supplying power to drive at least one light source includes: a current regulator connected in series with the at least one light source; and a conditioning circuit configured to receive an AC supply voltage having a primary frequency of between about 50 Hz to 60 Hz, and further configured to condition the received AC supply voltage to supply power to at least one light source, wherein the power has a non-zero DC component and an AC component, and wherein a magnitude of the AC component at a frequency that is four times the primary frequency is greater than a magnitude of the AC component at the primary frequency, and is also greater than a magnitude of the AC component at a second harmonic of the primary frequency.

In one embodiment, the magnitude of the AC component at the frequency that is four times the primary frequency is at least 10 times greater than the magnitude of the AC component at the primary frequency.

In one embodiment, the conditioning circuit includes a rectifier configured to receive the AC supply voltage, wherein the rectifier has a first output terminal connected to a bus to which the at least one light source is also connected, and wherein the rectifier has a second output terminal connected to ground; and a capacitor having a first end connected to the bus and having a second end connected to a parallel combination of: (1) a first branch that provides a charging current path for the capacitor and that blocks a discharging current of the capacitor from flowing through the first branch; and (2) a switching device that provides a controlled discharging current path for the capacitor, wherein the switching device has a first impedance when the switching device is open, and has a second impedance less than the first impedance when the switching device is closed.

According to one optional feature of this embodiment, the AC supply voltage is rectified to produce a rectified voltage, and wherein the switching device is open when the rectified voltage is greater than a threshold voltage, and wherein the switching device is closed when the rectified voltage is less than the threshold voltage.

According to another optional feature of this embodiment, the at least one light source is driven by the rectifier during a first portion of a period of the AC supply voltage, wherein the at least one light source is driven by the capacitor during a second portion of the period of the AC supply voltage, and wherein the first and second portions of the period of the AC supply voltage have approximately the same duration.

Generally, in still another aspect, a method is provided for driving at least one light source. The method includes: receiving an AC supply voltage having a primary frequency of between about 50 Hz to 60 Hz; and in response to the received AC supply voltage, supplying power to at least one light source connected in series with a regulated current source, wherein the power has a non-zero DC component and an AC component, and wherein a magnitude of the AC component at a frequency that is four times the primary frequency is greater than a magnitude of the AC component at the primary frequency, and is also greater than a magnitude of the AC component at a second harmonic of the primary frequency.

In one embodiment of the method, conditioning the received AC supply voltage includes: applying the received AC supply voltage to an input of a rectifier, wherein the rectifier has a first output terminal connected to a bus to which the at least one light source is also connected and wherein the rectifier has a second output terminal connected to ground; and selectively switching a second terminal of a capacitor to ground, wherein a first terminal of the capacitor is connected to the bus, wherein the at least one light source is driven by the rectifier during a first portion of a period of the AC supply voltage, wherein the at least one light source is driven by the capacitor during a second portion of the period of the AC supply voltage, wherein the first and second portions of the period of the AC supply voltage have approximately the same duration. According to one optional feature of this embodiment, the at least one light source is not driven during a third portion of the period of the AC supply voltage.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Generally, Applicants have recognized and appreciated that it would be beneficial to provide a driver for one or more light sources, such as LED light sources, that can increase the frequency of the predominant AC component in the power supplied to the one or more light sources. In view of the foregoing, various embodiments and implementations of the present invention are directed to a driver of a lighting unit, such as an LED-based lighting unit.

Figure 1:
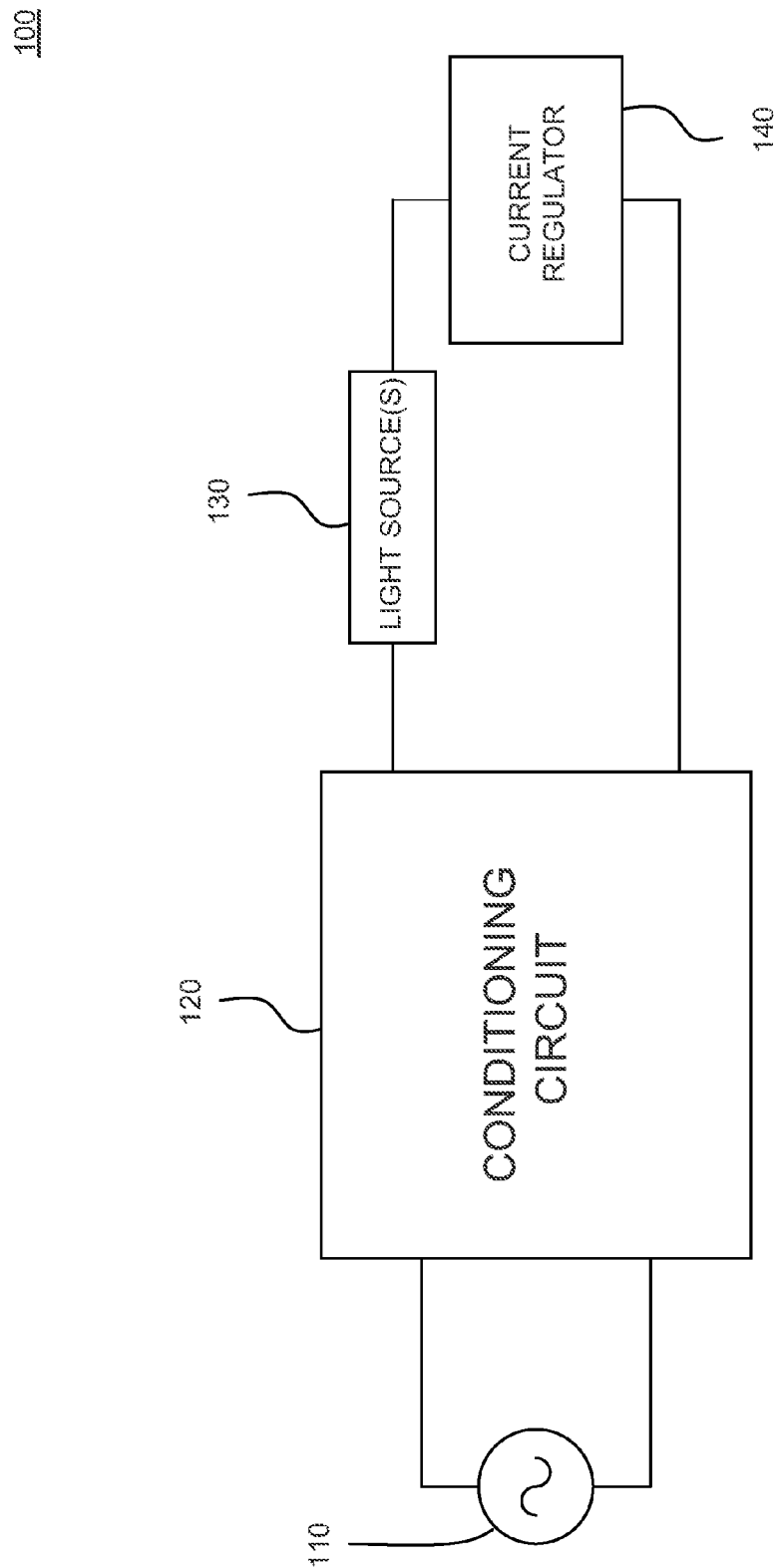
FIG. 1 shows a functional block diagram of a lighting unit including a driver and one or more light sources.

FIG. 1 shows a functional block diagram of a lighting unit 100 including a driver and one or more light sources 130 according to various embodiments of the invention. The driver includes a conditioning circuit 120 and a current regulator 140. In some embodiments, light source(s) 130 include one or more LEDs.

In some embodiments, conditioning circuit 120 receives an AC supply voltage 110, and in particular a so-called "mains" voltage produced from a power grid and having a primary frequency of between about 50 Hz to 60 Hz, for example 50 Hz in some countries such as those in Europe, and 60 Hz in other countries such as the United States. Conditioning circuit 120 converts the AC supply voltage 110 into a voltage suitable for driving light source(s) 130. In particular, conditioning circuit 120 conditions the received AC supply voltage 110 to supply power to light source(s) 130, where the power has a non-zero DC component and an AC component, and the magnitude of the AC component at a frequency that is four times the primary frequency (e.g., at a frequency of about 200 Hz or about 240 Hz) is greater than a magnitude of the AC component at the primary frequency, and is also greater than the magnitude of the AC component at the second harmonic of the primary frequency. Beneficially, the magnitude of the AC component of the power supplied to light source(s) 130 at a frequency that is four times the primary frequency of the AC supply voltage 110 is at least ten times greater than the magnitude of the AC component at the primary frequency and also at the second harmonic of the primary frequency.

Figure 2:
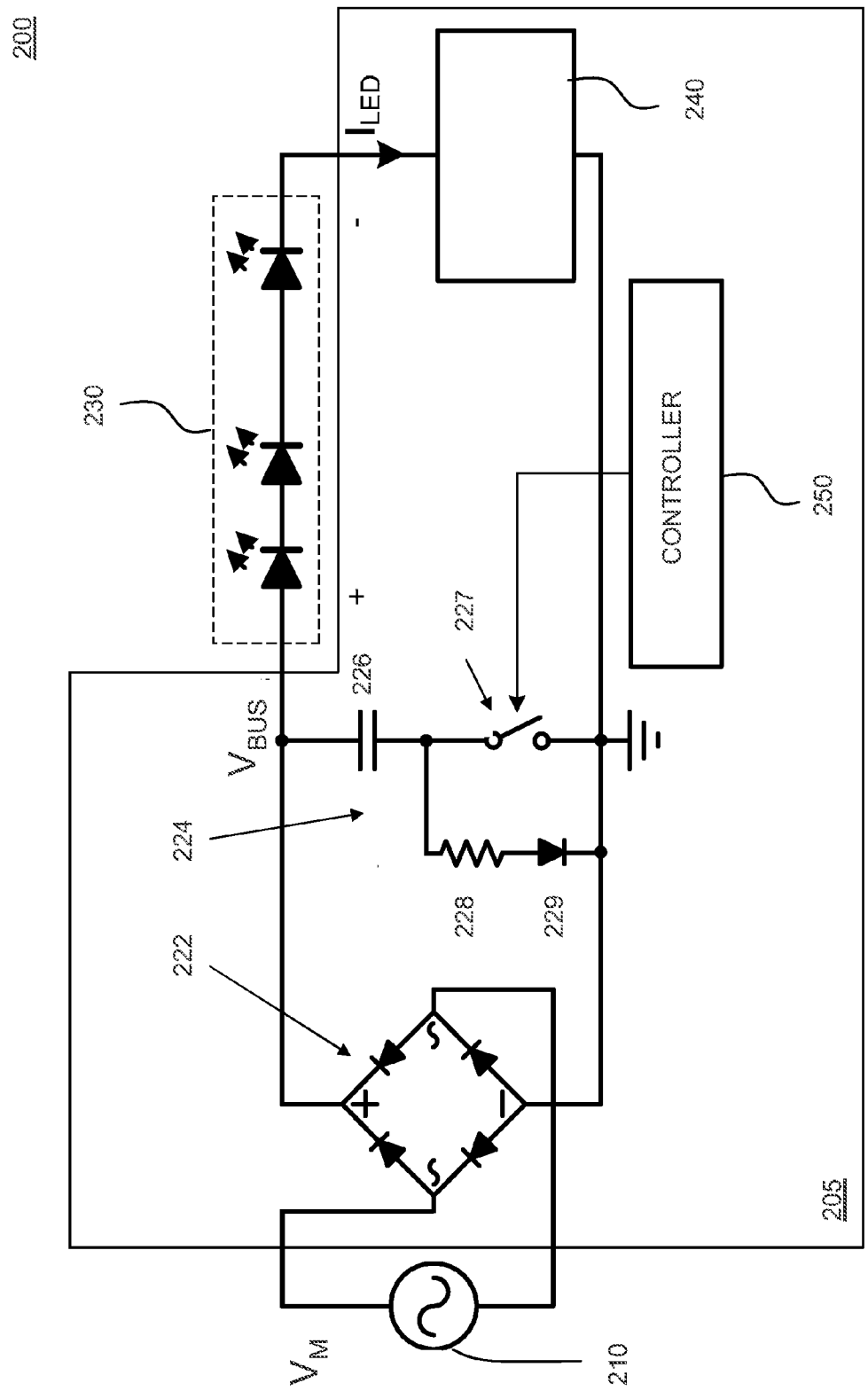
FIG. 2 shows a circuit diagram of one example embodiment of a lighting unit including a driver and one or more light sources.

FIG. 2 shows a circuit diagram of one example embodiment of a lighting unit 200 including a driver 205 and one or more light source(s) 230. Referring to FIG. 2, driver 205 includes rectifier 222, circuit 224, current regulator 240, and controller 250. Rectifier 222 has an input and an output, and is configured to receive an AC supply voltage 210 at its input, and its output is connected to light source(s) 230. Circuit 224 includes a capacitor 226 connected across the output of rectifier 222 via the parallel combination of: (1) a first branch comprising the series combination of a resistor 228 and a diode 229; and (2) a switching device 227. The first branch provides a charging current path for capacitor 226, and (by means of diode 229) blocks a discharging current of capacitor 226 from flowing through the first branch. Switching device 227 provides a controlled discharging current path for capacitor 226. Switching device 227 has a first impedance when switching device 227 is open, and has a second impedance less than the first impedance when switching device 227 is closed. Current regulator 240, which beneficially may be a linear current regulator, is connected in series with light source(s) 230 and regulates a current through light source(s) 230. Controller 250 controls a switching operation of switching device 229 as explained in greater detail below.

In some embodiments, light source(s) 230 include a string of high-voltage LEDs. Beneficially, the operating voltage of this LED string voltage is in the range 100% to 140% of the RMS of AC supply voltage 210, preferably in the range 110% to 130%, and most preferably about 120%~125%.

Figure 3:
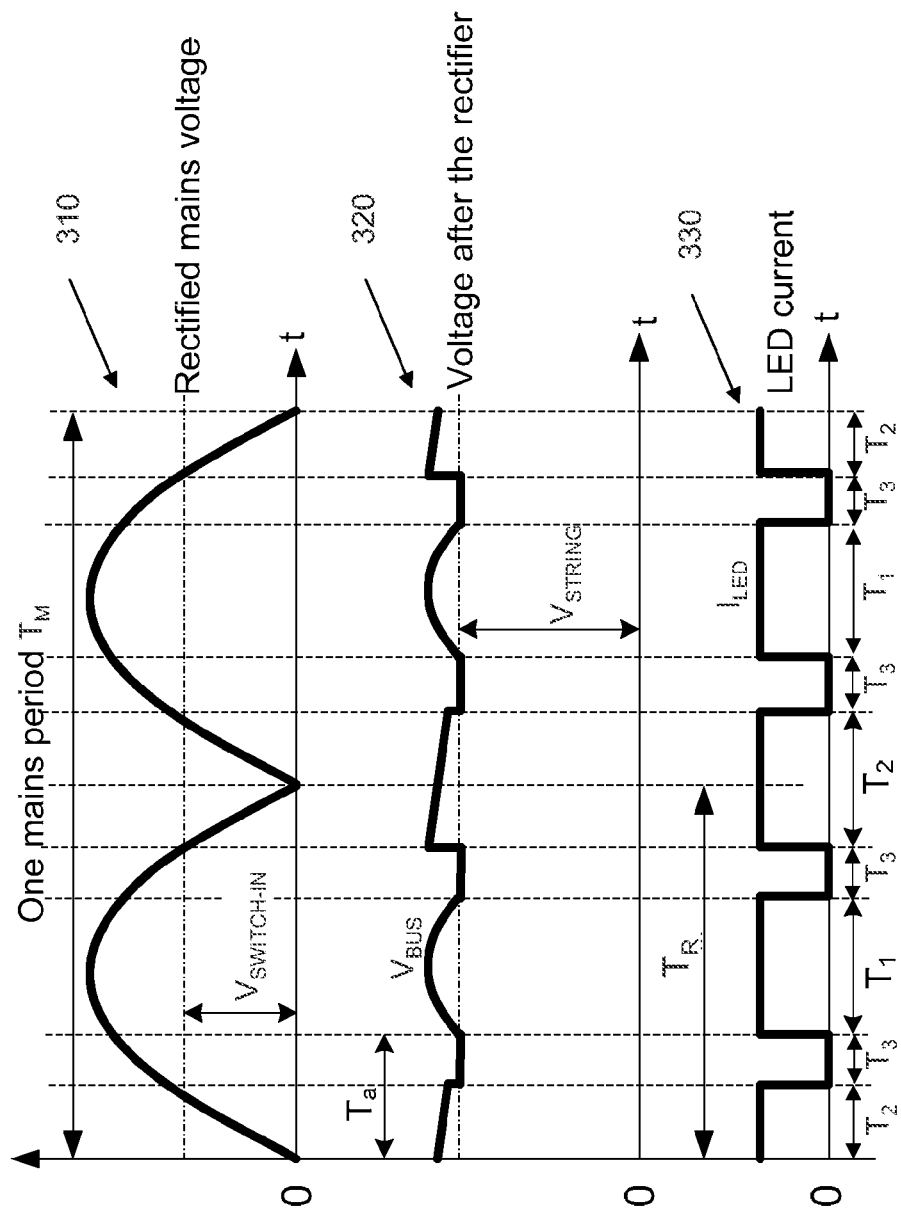
FIG. 3 shows voltage and current waveforms for illustrating an operation of the driver illustrated in FIG. 2.

An example operation of driver 205 will now be explained with reference to FIG. 3, showing voltage and current waveforms which will be used for illustrative purposes. Waveform 310 illustrates what the output voltage of rectifier 222 would look like in the absence of circuit 224 and 230. As can be seen from FIG. 3, the rectified voltage waveform has a period $T_R$ which is one-half the period $T_M$ of AC supply voltage 110, and accordingly the principal frequency of the rectified waveform is twice the principle frequency of AC supply voltage 110, or typically either about 100 Hz or 120 Hz. Waveform 320 illustrates the bus voltage $V_{BUS}$ at the output of rectifier 222 in the presence of circuit 224 and 230. Waveform 330 illustrates the current $I_{LED}$ through light source(s) 230.

Operationally, rectifier 222 receives AC supply voltage 210 and supplies an output voltage to capacitor 226 and light source(s) 230. Capacitor 226 is charged through resistor 228 and diode 229, and discharged through a switching device 227. More specifically, capacitor 226 is charged when switching device 227 is open, and capacitor 226 discharges when switching device 227 is closed. As a result of the switching operation of switching device 227, each period $T_M$ of AC supply voltage 110 (and indeed, each period $T_R=T_M/2$), can be divided into at least two portions: (1) a first portion or interval T1 when switching device 227 is open and where the bus voltage $V_{BUS}$ and the current $I_{LED}$ through light source(s) 230 are controlled by the output of rectifier 222; and (2) a second portion or interval T2 when switching device 227 is closed and where the bus voltage $V_{BUS}$ and the current $I_{LED}$ through light source(s) 230 are controlled by capacitor 226. As seen in waveform 330 in FIG. 3, the first and second portions T1 and T2 are repeated within each period $T_M$ of AC supply voltage 210. Beneficially, each period $T_M$ of AC supply voltage 210 further includes a third portion or interval T3 where light source(s) 230 are not driven and the current $I_{LED}$ through light source(s) 230 is at or about zero, as also shown in waveform 330.

As illustrated in FIG. 3, switching device 227 is turned ON at a predetermined threshold level ($V_{SWITCH-IN}$) of the instantaneous rectified AC supply voltage, and is turned OFF at the same threshold level. Beneficially, the predetermined threshold voltage level $V_{SWITCH-IN}$ is chosen such that the duty cycles of the LED current in the period T1 and in the period T2 are equal, such that the predominant component in the light is at four times the primary frequency of AC supply voltage 210 (e.g., about 200 Hz or 240 Hz), and the second harmonic of the primary frequency (e.g., at 100 Hz or 120 Hz) that predominates in waveform 310 in FIG. 3 is largely suppressed. Toward this end, the voltage across light source(s) 230, $V_{STRING}$, is chosen preferably about 120%~125% the RMS of AC supply voltage 210.

For a given value of $V_{STRING}$, the voltage $V_{SWITCH-IN}$ at which switching device 227 is closed can be calculated using the following equations.

$$T_a = \frac{T_M}{2\pi}\sin^{-1}\left(\frac{V_{STRING}}{\sqrt{2}\,V_M}\right) \quad (1)$$

where $T_a$ is the moment in each cycle $T_M$ at which LED current starts flowing, $V_M$ is the RMS AC supply voltage 210, and $T_M$ is the period of AC supply voltage 210;

$$T_1 = 0.5T_M - 2T_a; \quad (2)$$

$$T_2 = T_1 = 0.5T_M - 2T_a; \quad (3)$$

$$V_{SWITCH-IN} = \sqrt{2}\,V_M \sin\left(\frac{T_2}{T_M}\pi\right). \quad (4)$$

With the voltage $V_{SWITCH-IN}$ selected according to equations (1) through (4), the portions or intervals $T_1$ (when light source(s) 230 are driven by rectifier 222) and $T_2$ (when light source(s) are driven by capacitor 226) within the period $T_R$ (and therefore, also within the period $T_M$) will be equal to each other. In this way, the second harmonic component (e.g., at 100 Hz or 120 Hz) of the primary frequency (e.g., at 50 Hz or 60 Hz) of AC supply voltage 210 present in the light output can be minimized relative to the component at the fourth harmonic (e.g., at 200 Hz or 240 Hz).

In particular, driver 205 supplies power to light source(s) 230, wherein the power has a non-zero DC component and an AC component, and the magnitude of the AC component at a frequency that is four times the primary frequency of AC supply voltage 210 (e.g., at a frequency of about 200 Hz or about 240 Hz), is greater than a magnitude of the AC component at the primary frequency, and is also greater than the magnitude of the AC component at the second harmonic of the primary frequency. Beneficially, the magnitude of the AC component of the power supplied to light source(s) 230 at a frequency that is four times the primary frequency of the AC supply voltage 210 is at least ten times greater than the magnitude of the AC component at the primary frequency and also at the second harmonic of the primary frequency. In some embodiments, driver 205 may be constructed using low cost discrete components.

Figure 4:
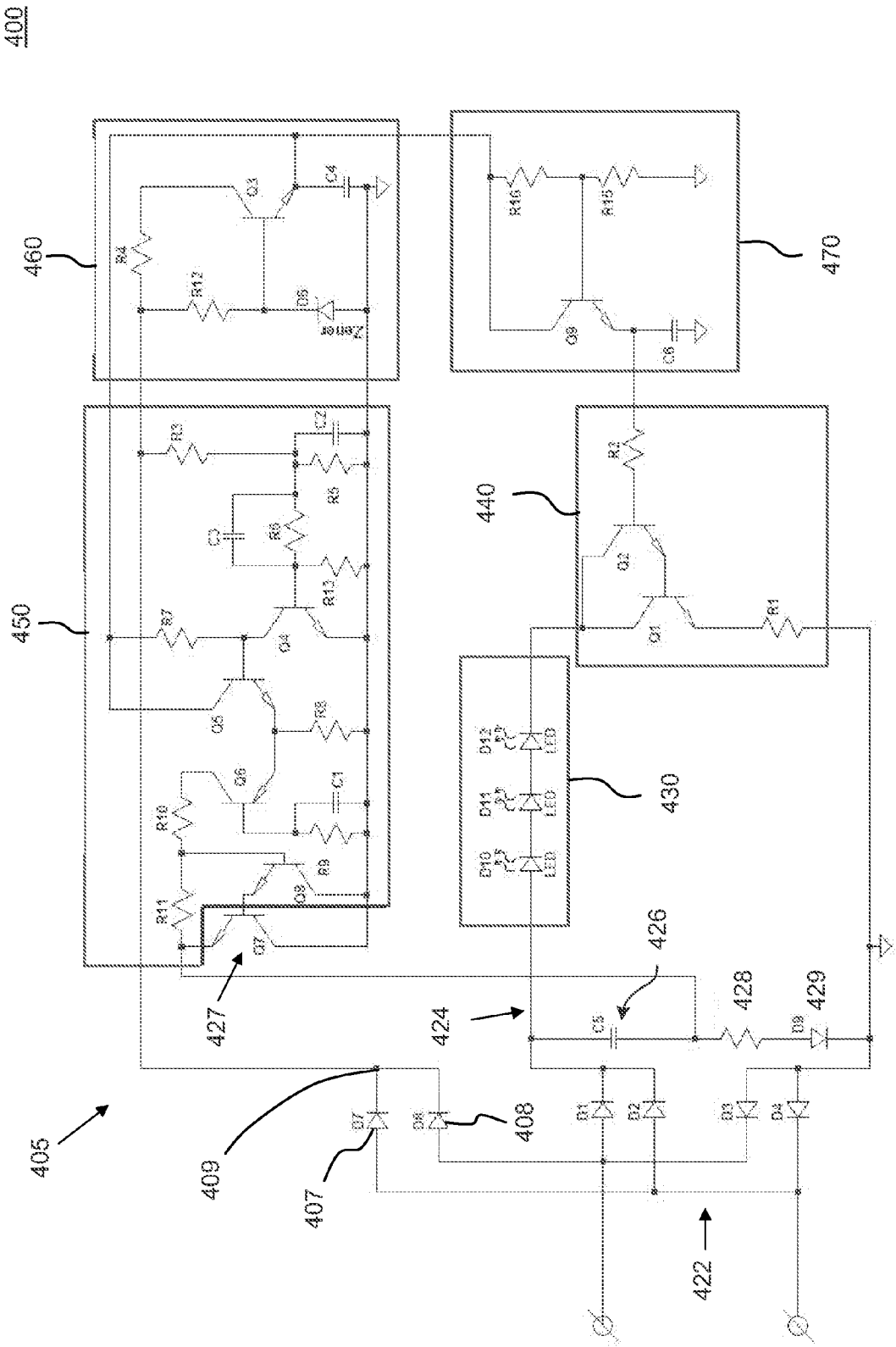
FIG. 4 shows a detailed schematic diagram of one example embodiment of a lighting unit including a driver and one or more light sources.

FIG. 4 shows a detailed schematic diagram of one example embodiment of a lighting unit 400 including a driver 405 and one or more light sources 430. Driver 405 includes rectifier 422, circuit 424, current regulator 440, controller 450, low voltage supply 460, and a current setting circuit 470. Rectifier 422 includes the diodes D1/D2/D3/D4 and is configured to receive an AC supply voltage (e.g., a so-called "mains" voltage) at its input, and its output is connected to light source(s) 430. Circuit 424 includes a capacitor 426 connected across the output of rectifier 422 via the parallel combination of: (1) a first branch comprising the series combination of a resistor 428 and a diode 429; and (2) a switching device (e.g., a transistor) 427. The first branch provides a charging current path for capacitor 426, and (by means of diode 429) blocks a discharging current of capacitor 426 from flowing through the first branch. Switching device 427 provides a controlled discharging current path for capacitor 426. Switching device 427 has a first impedance when switching device 427 is open, and has a second impedance less than the first impedance when switching device 427 is closed. Current regulator 440, which beneficially may be a linear current regulator, is connected in series with light source(s) 430 and regulates a current through light source(s) 430. Controller 450 controls a switching operation of switching device 427.

In some embodiments, light source(s) 430 include a string of high-voltage LEDs. Beneficially, the operating voltage of this LED string voltage is in the range 100% to 140% of the RMS of the AC supply voltage, preferably in the range 110% to 130%, and most preferably about 120%~125%.

Beneficially, current regulator 440 is a linear current regulator and includes Darlington transistor Q1 and Q2. Low voltage supply 460 is derived from the AC supply voltage using a linear voltage regulator built around Q3. Current setting circuit 470 includes a voltage follower built around Q9 for providing a (DC) control voltage to current regulator 440.

Figure 5:
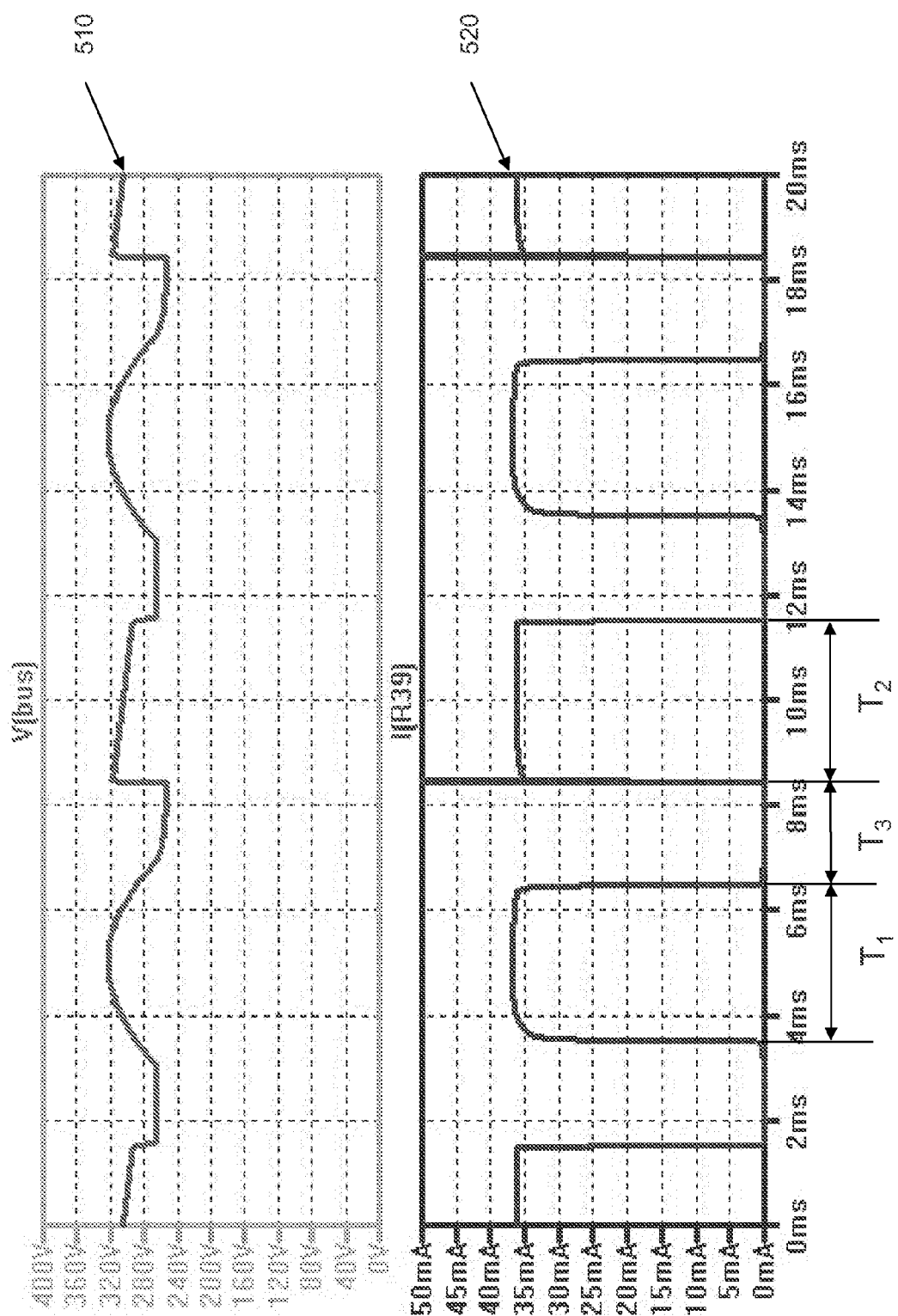
FIG. 5 shows voltage and current waveforms for illustrating an operation of the driver illustrated in FIG. 4.

An example operation of driver 405 will now be explained. FIG. 5 shows example voltage and current waveforms for driver 405. In particular, FIG. 5 shows a waveform 510 for the DC bus voltage $V_{BUS}$, and a waveform 520 for the LED current $I_{LED}$. As a result of the switching operation of switching device 427, each period $T_M$ of the AC supply voltage can be divided into at least two portions: (1) a first portion or interval $T_1$ when switching device 427 is open and where the bus voltage $V_{BUS}$ and the current $I_{LED}$ through light source(s) 430 are controlled by the output of rectifier 422; and (2) a second portion or interval $T_2$ when switching device 427 is closed and where the bus voltage $V_{BUS}$ and the current $I_{LED}$ through light source(s) 430 are controlled by capacitor 426.

In operation, the AC supply voltage is supplied to rectifier 422, and also to a "second rectifier" formed by the diodes D3 and D4 of rectifier 422 and diodes 407 and 408 which are antipodally connected to each other at a node 409. The voltage at node 409 may be a rectified AC voltage, similar to waveform 310 in FIG. 3, and is provided to resistor R3 in controller 450. Controller 450 includes several bipolar transistors and resistors. In particular, resistors R3, R5, R6, and R13 form a resistor divider which sets the threshold voltage $V_{SWITCH-IN}$ for opening and closing switching device 427, and which determines the time periods $T_1$ and $T_2$ as shown in FIG. 5. Capacitor 426 is charged through resistor 428 and diode 429 when the voltage at node 409 is greater than $V_{SWITCH-IN}$, and is discharged through switching device 427 when the voltage at node 409 is less than $V_{SWITCH-IN}$.

Figure 6:
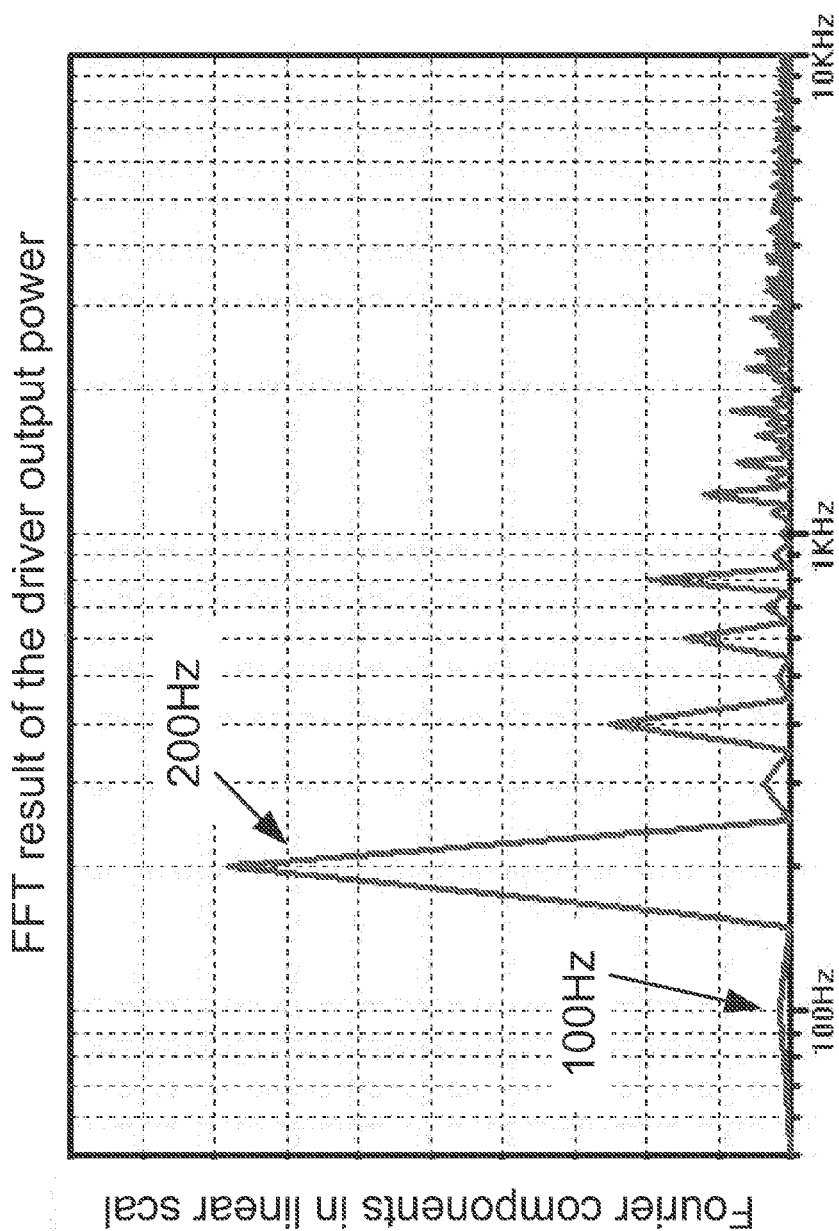
FIG. 6 illustrates an example frequency spectrum of the power applied to a light source by one example embodiment of a driver.

FIG. 6 illustrates an example frequency spectrum 600 of the power applied to light source(s) 430 by driver 405 of FIG. 4 in a case where the primary frequency of the AC supply voltage is at 50 Hz. It is seen that the predominant frequency component of the power applied to light source(s) 430 is at 200 Hz, or the fourth harmonic of the AC supply voltage. Of course in cases where the primary frequency is 60 Hz, then the fourth harmonic and the predominant frequency component of power supplied to light source(s) 430 would be at 240 Hz. As shown in FIG. 6, the second harmonic component (e.g., at 100 Hz) is largely suppressed.

In general, the magnitude of the AC component of the power supplied by driver 405 to light source(s) 430 at a frequency that is four times the primary frequency of the AC supply voltage is greater than the magnitude of the AC component at the primary frequency, and is also greater than the magnitude of the AC component at the second harmonic of the primary frequency. Beneficially, the magnitude of the AC component of the power supplied to light source(s) 430 at a frequency that is four times the primary frequency of the AC supply voltage is at least ten times greater than the magnitude of the AC component at the primary frequency and also at the second harmonic of the primary frequency. Therefore, the flicker perceived by human eye can be reduced compared to a lighting device where the light source(s) are just driven by the output of a rectifier.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

As used herein, the terms "approximately," "about" and "nearly" each mean within 10%, and the term "substantially" means at least 75%.

Any reference numerals or other characters, appearing between parentheses in the claims, are provided merely for convenience and are not intended to limit the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A driver for supplying power to drive at least one light source, the driver comprising:
   a rectifier having an input and an output, wherein the rectifier is configured to receive an AC supply voltage at its input, and wherein the rectifier output is connected to the at least one light source; and
   a capacitor connected across the rectifier output;
   a switching device that provides a controlled discharging current path for the capacitor;
   wherein the at least one light source is driven by the rectifier output during a first portion of a period of the AC supply voltage during which there is no current discharge path for the capacitor, wherein the at least one light source is driven by the capacitor during a second portion of the period of the AC supply voltage, wherein the time intervals when the at least one light source is driven by the rectifier output and when the at least one light source is driven by the capacitor within a half period of the AC supply voltage have approximately the same duration.

2. The driver of claim 1, wherein the at least one light source is not driven during a third portion of the period of the AC supply voltage.

3. The driver of claim 1, wherein the capacitor is connected across the rectifier output in series with a parallel combination of: a first branch that provides a charging current path for the capacitor and that blocks a discharging current of the capacitor from flowing through the first branch; and wherein the switching device has a first impedance when the switching device is open, and has a second impedance less than the first impedance when the switching device is closed.

4. The driver of claim 3, further comprising a pair of diodes connected antipodally to each other across the rectifier input, and providing a rectified voltage at a node in between the pair of diodes.

5. The driver of claim 4, further comprising a controller configured to control the switching device, wherein the controller controls the switching device to be open when the rectified voltage is greater than a threshold voltage (VSWITCH-IN), and controls the switching device to be closed when the rectified voltage is less than the threshold voltage.

6. The driver of claim 4, wherein the switching device is open when the rectified voltage is greater than a threshold voltage, and wherein the switching device is closed when the rectified voltage is less than the threshold voltage.

7. The driver of claim 1, further comprising a linear current regulator configured to be connected in series with the at least one light source.

8. The driver of claim 1, wherein the AC supply voltage has a primary frequency of between about 50 Hz to 60 Hz, and wherein the driver supplies a power to the at least one light source which has a non-zero DC component and an AC component, and wherein a magnitude of the AC component at a frequency that is four times the primary frequency is greater than a magnitude of the AC component at the primary frequency.

9. A driver for supplying power to drive at least one light source, the driver comprising:
   a current regulator connected in series with the at least one light source; and
   a conditioning circuit configured to receive an AC supply voltage having a primary frequency of between about 50 Hz to 60 Hz, and further configured to condition the received AC supply voltage to supply power to the at least one light source, wherein the power has a non-zero DC component and an AC component, and
   wherein a magnitude of the AC component at a frequency that is four times the primary frequency is greater than a magnitude of the AC component at the primary frequency, and is also greater than a magnitude of the AC component at a second harmonic of the primary frequency.

10. The driver of claim 9, wherein the magnitude of the AC component at the frequency that is four times the primary frequency is at least 10 times greater than the magnitude of the AC component at the primary frequency.

11. The driver of claim 9, wherein the conditioning circuit comprises:
    a rectifier configured to receive the AC supply voltage, wherein the rectifier has a first output terminal connected to a bus to which the at least one light source is also connected, and wherein the rectifier has a second output terminal connected to ground; and
    a capacitor having a first end connected to the bus and having a second end connected to a parallel combination of: a first branch that provides a charging current path for the capacitor and that blocks a discharging current of the capacitor from flowing through the first branch; and a switching device that provides a controlled discharging current path for the capacitor, wherein the switching device has a first impedance when the switching device is open, and has a second impedance less than the first impedance when the switching device is closed.

12. The driver of claim 11, wherein the AC supply voltage is rectified to produce a rectified voltage, and wherein the switching device is open when the rectified voltage is greater than a threshold voltage (VSWITCH-IN), and wherein the switching device is closed when the rectified voltage is less than the threshold voltage.

13. The driver of claim 11, wherein the at least one light source is driven by the rectifier during a first portion of a period of the AC supply voltage, wherein the at least one light source is driven by the capacitor during a second portion of the period of the AC supply voltage, and wherein the first and second portions of the period of the AC supply voltage have approximately the same duration.

14. The driver of claim 13, wherein the at least one light source is not driven during a third portion of the period of the AC supply voltage.

15. A method of driving at least one light source, the method including:
    receiving an AC supply voltage having a primary frequency of between about 50 Hz to 60 Hz; and
    applying the received AC supply voltage to an input of a rectifier, wherein the rectifier has a first output terminal connected to a bus to which the at least one light source is also connected and wherein the rectifier has a second output terminal connected to ground; and
    selectively switching a second terminal of a capacitor to ground, wherein a first terminal of the capacitor is connected to the bus,
    wherein the at least one light source is driven by the rectifier during a first portion of a period of the AC supply voltage during which there is no current discharge path for the capacitor, and wherein the at least one light source is driven by the capacitor during a second portion of the period of the AC supply voltage, such that the time intervals when the at least one light source is driven by the rectifier output and when the at least one light source is driven by the capacitor within a half period of the AC supply voltage have approximately the same duration.

16. The method of claim 15, wherein the at least one light source is not driven during a third portion of the period of the AC supply voltage.

* * * * *